(12) United States Patent
Wilson

(10) Patent No.: US 11,199,088 B2
(45) Date of Patent: Dec. 14, 2021

(54) MULTI-WELL FIBER OPTIC ELECTROMAGNETIC SYSTEMS

(71) Applicant: Halliburton Energy Services, Inc., Houston, TX (US)

(72) Inventor: Glenn Andrew Wilson, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 62 days.

(21) Appl. No.: 16/485,361

(22) PCT Filed: Nov. 15, 2018

(86) PCT No.: PCT/US2018/061288
§ 371 (c)(1),
(2) Date: Aug. 12, 2019

(87) PCT Pub. No.: WO2020/101688
PCT Pub. Date: May 22, 2020

(65) Prior Publication Data
US 2021/0048552 A1 Feb. 18, 2021

(51) Int. Cl.
*E21B 49/00* (2006.01)
*E21B 47/07* (2012.01)
*E21B 34/06* (2006.01)
*G01V 3/26* (2006.01)
*G01V 3/38* (2006.01)
(Continued)

(52) U.S. Cl.
CPC .............. *E21B 49/00* (2013.01); *E21B 34/06* (2013.01); *E21B 47/07* (2020.05); *G01V 3/26* (2013.01); *G01V 3/38* (2013.01); *E21B 43/16* (2013.01); *E21B 43/26* (2013.01); *E21B 2200/20* (2020.05)

(58) Field of Classification Search
CPC .......... E21B 49/00; E21B 34/06; E21B 47/07; E21B 43/16; E21B 2200/20; E21B 43/26; G01V 3/26; G01V 3/38
See application file for complete search history.

(56) References Cited

U.S. PATENT DOCUMENTS 6,393,363 B1  5/2002  Wilt et al.
6,534,986 B2  3/2003  Nichols
(Continued)

OTHER PUBLICATIONS

PCT Application Serial No. PCT/US2018/061288, International Written Opinion, dated Aug. 2, 2019, 7 pages.
(Continued)

*Primary Examiner* — Brad Harcourt
(74) *Attorney, Agent, or Firm* — Gilliam IP PLLC

(57) ABSTRACT

A method includes activating a first electromagnetic source at a first frequency, acquiring a first set of electromagnetic measurements from a first fiber optic electromagnetic sensor in a first well, wherein the first fiber optic electromagnetic sensor is in electromagnetic communication with the first electromagnetic source. The method also includes acquiring a second set of electromagnetic measurements from a second fiber optic sensor in a second well, wherein the second fiber optic sensor is in electromagnetic communication with the first electromagnetic source. The method also includes determining a formation property based on the first set of electromagnetic measurements and the second set of electromagnetic measurements.

18 Claims, 5 Drawing Sheets

(51) Int. Cl.
*E21B 43/16* (2006.01)
*E21B 43/26* (2006.01)

(56) References Cited

U.S. PATENT DOCUMENTS

| | | |
|---|---|---|
| 8,332,191 B2 | 12/2012 | Rosthal et al. |
| 8,400,159 B2 | 3/2013 | Gao et al. |
| 8,614,578 B2 | 12/2013 | Gao et al. |
| 8,816,689 B2 | 8/2014 | Colombo et al. |
| 2003/0038634 A1 | 2/2003 | Strack |
| 2004/0065439 A1* | 4/2004 | Tubel .................. E21B 47/11 166/250.15 |
| 2006/0221768 A1 | 5/2006 | Hall et al. |
| 2010/0126717 A1 | 5/2010 | Kuchuk et al. |
| 2010/0198519 A1 | 8/2010 | Wilt et al. |
| 2010/0271030 A1 | 10/2010 | Reiderman et al. |
| 2012/0191353 A1 | 7/2012 | Wilt et al. |
| 2015/0061684 A1* | 3/2015 | Marsala .................. G01V 3/20 324/355 |
| 2016/0290124 A1 | 10/2016 | Chemali et al. |
| 2017/0044886 A1* | 2/2017 | Jaaskelainen ......... E21B 47/135 |
| 2017/0082770 A1 | 3/2017 | Mandviwala et al. |
| 2017/0218752 A1 | 8/2017 | Donderici et al. |

OTHER PUBLICATIONS

PCT Application Serial No. PCT/US2018/061288, International Search Report, dated Aug. 2, 2019, 3 pages.

Alumbaugh, et al., "Monitoring subsurface changes over time with cross-well electromagnetic tomography: Geophysical Prospecting", Geophysical Prospecting. 1995, 43, 873-902, 30 pages.

Balan, et al., "Deep reading technology integrated with inflow control devices to improve sweep efficiency in horizontal waterfloods", Paper presented at the Abu Dhabi International Petroleum Exhibition & Conference, Abu Dhabi, UAE, Nov. 2016., 9 pages.

Marsala, et al., "Crosswell electromagnetic tomography, from resistivity mapping to interwell fluid distribution", Paper presented at the International Petroleum Technology Conference, Kuala Lumpur, Malaysia, Dec. 2008, 6 pages.

Rovetta, et al., "Petrophysical joint inversion of multi-geophysical attributes and measurements for reservoir characterization", Paper presented at the SPE Middle East Oil & Gas Show and Conference, Manama, Kingdom of Bahrain, Mar. 2017, 13 pages.

Wilt, et al., "Crosswell electromagnetic tomography: System design considerations and field results", Geophysics, vol. 60, No. 3 (May-Jun. 1993) p. 871-885, 15 pages.

* cited by examiner

MULTI-WELL FIBER OPTIC ELECTROMAGNETIC SYSTEMS

BACKGROUND

The disclosure generally relates to the field of reservoir monitoring, and more particularly to reservoir monitoring between multiple wells penetrating a reservoir.

Hydrocarbons, such as oil and natural gas, are commonly obtained from multi-well fields that have wells distributed above a subterranean formation. Various drilling and reservoir management operations improve the quantity of the hydrocarbons produced. Such reservoir management operations include injecting one well of a multi-well field with an injection fluid, stimulating a well with an acid, fracture, or reactive fluid, and/or directly heating the subterranean formation.

Tracking formation properties during drilling and reservoir management operations provide formation information to help determine what operations to perform and what appropriate parameters to use for these operations. Changes in the electrical properties of a formation directly correspond with changes in other formation properties, such as fluid saturation. Increasing the range and accuracy of any electrical property measurements increases the range and accuracy of formation property measurements in the formation as a whole.

BRIEF DESCRIPTION OF THE DRAWINGS

Examples of the disclosure can be better understood by referencing the accompanying drawings.

DESCRIPTION OF EMBODIMENTS

Figure 1:
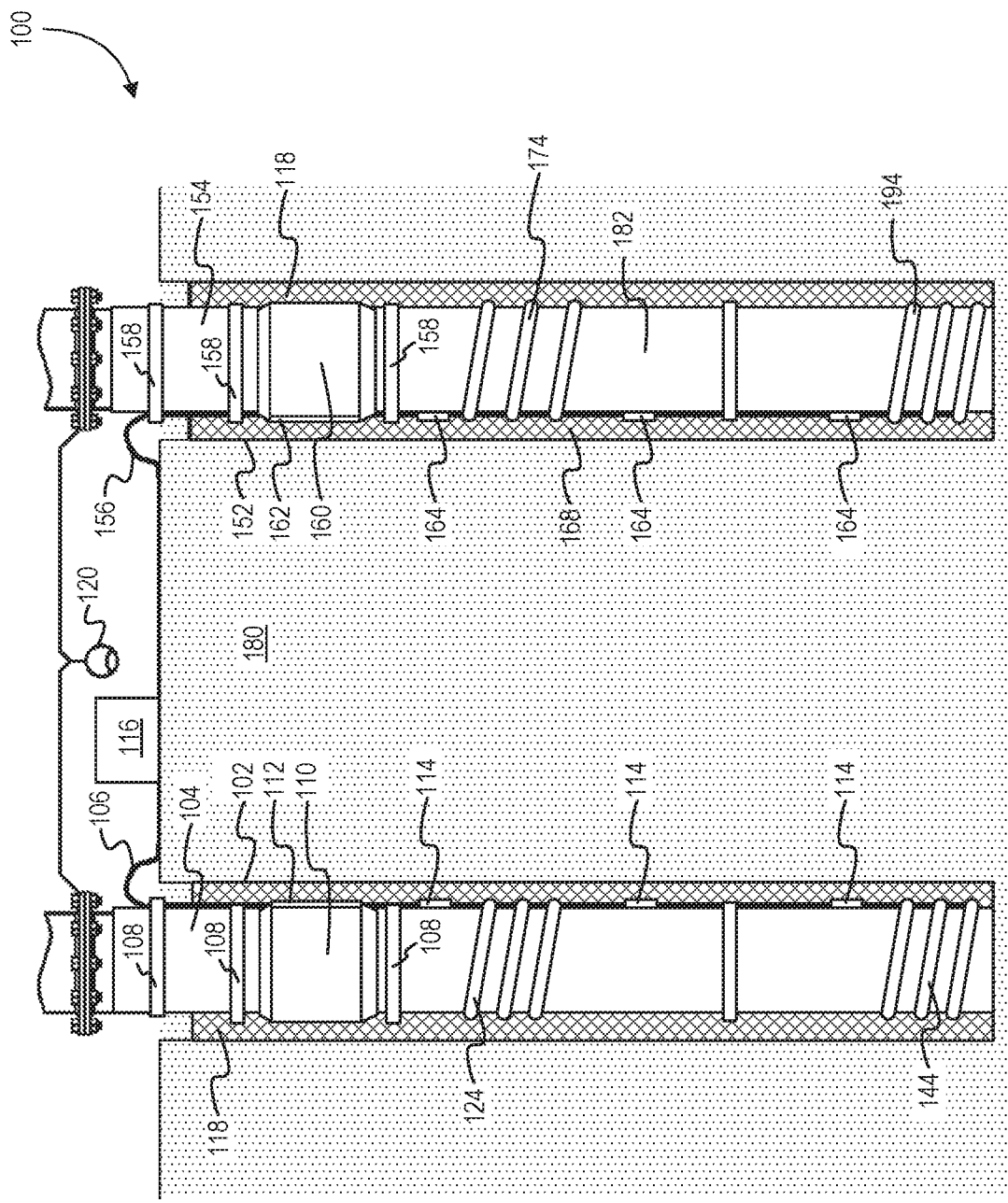
FIG. 1 depicts an example multi-well fiber optic electromagnetic (EM) system, according to some embodiments.

The description that follows includes example systems, methods, techniques, and program flows that embody embodiments of the disclosure. However, it is understood that this disclosure can be practiced without these specific details. For instance, this disclosure refers to downhole electromagnetic sources in illustrative examples. Embodiments of this disclosure can also be applied to other electromagnetic sources positioned at the surface of the Earth, e.g., in a body of water. In other instances, well-known instruction instances, protocols, structures and techniques have not been shown in detail in order not to obfuscate the description.

Fiber optic electromagnetic (EM) sensors can be deployed into multiple wells of a multi-well system to allow for collection of time-lapse EM measurements from the fiber optic EM sensors without interruption from drilling/reservoir management operations. The fiber optic EM sensors can continue collecting measurements without interruption from ongoing drilling/reservoir management operations because the sensors are deployed into multiple wells, e.g., behind casing and without being installed on a well tool. Ongoing collection of these EM measurements facilitates intelligent management of operations throughout the life of multi-well systems (i.e., production fields) during which time various events can change the state of the reservoir. For instance, the EM measurements can be used to inform flow control during an injection operation, which typically could not be done because a well tool would impede the injection fluid flow and potentially damage the well tool. This is just one example of how the multi-well fiber optic EM sensors can be used to determine quasi-static and dynamic data to determine formation properties (e.g., fluid saturation, rate of change in formation saturation, etc.) for both onshore and offshore fields. The various reservoir management operations that can be informed by assessments based on the ongoing measurements include optimizing production, determining well injection practices, determining appropriate intervention strategies, operations in advance of unfavorable or unexpected production scenarios, other well operations, etc. These EM measurements can be acquired from vertical wells, angled wells, and horizontal wells by a fiber optic EM sensor. Long-term deployment (e.g., on casing) of fiber optic EM sensors throughout a multi-well system facilitates the ongoing collection of EM measurements.

Wells of a multi-well system can be used to produce fluids and/or inject fluids. Fiber optic EM sensors can be deployed into new or existing wells as part of a well tool or installed into at least one of the wells of the multi-well field. At least one component of an EM signal generated by an EM source can be measured by a deployed fiber optic EM sensor. Deploying the fiber optic EM sensors can include deploying the fiber optic EM sensors into either cased-hole or open-hole well completions. Fiber optic EM sensors can be deployed outside of the casing. Alternatively, the fiber optic EM sensors can be deployed inside of the casing (e.g., on production tubing), or as a part of an open-hole completion (e.g., via wireline, slickline, or coiled-tubing), etc. The fiber optic EM sensors can be deployed as passive sensing devices, and can be connected to active electronic devices at the surface. Leaving the active electronic devices at the surface reduces the chance of device failure and decreases replacement cost.

In some embodiments, the EM measurements can be acquired by the fiber optic EM sensors during fluid displacement into or out of the well. An EM source generates at least one of an electric signal, magnetic signal, or EM signal, and can be deployed at the surface and/or in a well to generate the EM signals for the fiber optic EM sensors to measure. The fiber optic EM sensors can be attached to the well and/or mechanically stabilized to inhibit sensor motion during fluid flow through the well. Such attachments can increase sensor accuracy and inhibit motion. Fiber optic EM sensors can continuously or periodically acquire measurements. For example, the EM measurements can be collected with their corresponding time of measurements to generate time-lapse EM measurements.

Multiple fiber optic EM sensors can be deployed simultaneously and can be used in conjunction with other fiber optic sensors, such as distributed strain sensors (DSS), distributed temperature sensors (DTS), distributed acoustic sensors (DAS), pressure sensors, or multicomponent seismic sensors. These other types of fiber optic sensors can be operated from the same fiber optic cable, or from separate fiber optic cables bundled together with the fiber optic EM sensors (e.g., fiber optic cables bundled into the same thermally expanded core). For example, bundled fiber optic sensors can include fiber optic EM sensors, pressure, DSS, DTS, and DAS. An interrogator system can be configured to acquire EM measurements, strain measurements, temperature measurements, and/or acoustic measurements by changing interrogator operations (e.g., changing light wavelengths, timing of light pulses, etc.) to correspond with the relevant sensors connected to the interrogator system. For example, when connected to a fiber optic cable with EM sensors, DTS, and DAS, the interrogator system can emit light at a first wavelength through the fiber optic cable to acquire EM measurements from the EM sensors, emit light at a second wavelength to acquire temperature measurements from the DTS, and emit light at a third wavelength to acquire acoustic measurements from the DAS. Deploying fiber optic EM sensors bundled with other fiber optic sensors can have a minimal increase in cost with a significant increase in the number and types of measurements from a well. Combining measurements from the fiber optic EM sensor with other fiber optic sensors (e.g., DSS, DTS, DAS pressure, multicomponent seismic) can provide measurements for life-of-well production and reservoir monitoring.

The fiber optic EM sensors can be remotely interrogated using optical multiplexing methods. Fiber optic EM sensors can include distributed electric field sensors, distributed magnetic field sensors, discrete electric field sensors, discrete magnetic field sensors, etc. For example, fiber optic EM sensors can include coils as discrete magnetic field sensors. Alternatively, fiber optic EM sensors can include electrodes as distributed electric field sensors. The fiber optic sensor system can include a global positioning system (GPS) for time-synchronization with respect to one or more EM sources. Time-synchronization measurements can be transmitted by electrical or optical telemetry methods to a remote computer. The EM measurements can also be integrated with various geophysical and production measurements to improve reservoir modeling operations.

The multi-well fiber optic EM system can acquire EM measurements without well intervention during hydrocarbon production. The EM measurements can be used during early production monitoring when reservoir uncertainty is high to forecast future production rates. The EM measurements can also be used to monitor fluids after early production (e.g., in mature fields) to improve accuracy during determination of formation properties and features. The EM measurements can be acquired during hydrocarbon production, and during reservoir management operations such carbon sequestration, steam injection, water injection, EM contrast agent injection, carbon dioxide injection, injection of other fluids into the reservoir, etc. The formation information based on these EM measurements can be used to initiate/modify a reservoir management operation (e.g., initiate a rework of an existing well, change an injection pressure, etc.) or a drilling operation (e.g., drill a new well in the formation). For example, an intelligent completions system with controllable downhole valves can respond to EM measurements or models generated based on the EM measurements during reservoir management operations.

Example Illustrations

FIG. 1 depicts an example multi-well fiber optic electromagnetic (EM) system, according to some embodiments. The formation 180 has a first well 102 and a second well 152. The annular space of the first well 102 and second well 152 can be filled with cement 118 to secure in place a casing 104 in the first well 102 and a casing 154 in the second well 152 and prevent fluid flow in the annular space of the first well 102 and the second well 152, respectively. A fiber optic cable 106 is installed into the first well 102 by being secured to the exterior of the casing 104 by bands 108. Likewise, a fiber optic cable 156 is installed into the second well 152 by being secured to the exterior of the casing 154 by bands 158. The casing 104 and casing 154 can be tubular pipes made of metal that preserve the integrity of the well walls. Where the fiber optic cable 106 passes over the casing joint 110, it can be protected from damage by the cable protector 112 attached to the casing 104. Similarly, where the fiber optic cable 156 passes over the casing joint 160, it can be protected from damage by the cable protector 162 attached to the casing 154. EM sensors 114 are integrated into the fiber optic cable 106 and EM sensors 164 are integrated into the fiber optic cable 156 to obtain EM signal measurements and communicate those measurements to a surface interrogator 116. In alternative embodiments, fiber optic cables can be deployed in a borehole by being attached to production tubing, a wireline cable, slickline cable, coiled tubing, etc.

The surface interrogator 116 includes an optical port for coupling the optical fibers in the fiber optic cables 106 and 156 to one or more light sources and detectors. The one or more light sources transmits pulses of light along the fiber optic cables, including to the EM sensors 114 and EM sensors 164, each of which can be surrounded by sensor housing. The EM sensors 114 and 164 modify the light pulses to provide measurements of field strength, field gradient, or time derivative for electrical fields and/or magnetic fields. The modifications can affect amplitude, phase, or frequency content of the light pulses, enabling the detector to responsively produce an electrical output signal indicative of the sensor measurements. Some fiber optic systems can employ multiple fibers, in which case an additional light source and detector can be employed for each fiber, or the existing source and detector can be switched periodically between the fibers. An interrogator can employ continuous wave light rather than light pulses. Depending on the frequency of an EM signal, the fiber optic EM sensor can accurately measure formation resistivity of regions in the formation that are 10 to 1000 feet away from the fiber optic EM sensor. The fiber optic EM sensor can measure formation resistivity for regions that are greater than 1000 feet away from the fiber optic EM sensor when detecting an EM signal with a very low frequency.

A first upper transmitter 124, a second upper transmitter 174, a first lower transmitter 144, and a second lower transmitter 194 is powered by the surface power source 120. Each of the transmitters is deployed downhole, and is a magnetic induction loop antenna wrapped around the casing. Each of the transmitters is an EM source with a moment parallel to the casing it is wrapped around and in electromagnetic communication with at least one of the EM sensors 114 and 164. In some embodiments, the separation space between the transmitters of a well can be based on factors such as EM source operating frequencies, a depth of investigation, a target feature/phenomenon, the measurement capabilities of the fiber optic EM sensors, etc. For example, an EM source spacing can be based on the distance between permeable geological layers in the formation. Likewise, an EM source spacing of 100 feet can be sufficient when the well is parallel to the permeable layers in the formation.

In alternative embodiments, the EM sources can be deployed downhole or on the surface as electric sources. An electric source can be a monopole, dipole, tripole, quadrupole, etc., and can include the use of a wellhead as an electrode. Alternatively, the one or more EM sources can be magnetic sources deployed at the surface. For example, the one or more EM sources can be deployed at the surface as magnetic loop antennas. One or more EM sources deployed in the casing 104 and/or casing 154 can be a part of a well tool, a permanently installed module attached to the casing, a device external exposed to the well wall, etc.

In some embodiments, the surface power source 120 can be a power module, with power consumption and electrical interfaces defined by appropriate oilfield power standards (e.g., Intelligent Well Interface Standardization for offshore wells). The surface power source 120 and/or other power sources connected to the EM sources can be powered by batteries, fuel cells, solar cells, various energy-harvesting devices, etc. The surface power source 120 can also be used to provide cathodic protection in one or more wells by keeping one or more parts in the well system (e.g., casing, production tubing, sensors, etc.) in a cathodic state.

The magnitude and distribution of the current flow can vary in accordance with the source voltage and the formation's resistivity profile. This variation can be measured by the EM sensors 114 and EM sensors 164 to generate a resistivity profile. This resistivity profile can be used to measure the fluids in the formation and determine the state of the well, such as determining a location and shape of a flood front in the formation. A GPS can be connected to the EM sources either directly or indirectly to allow geolocation and time-synchronization with measurements taken by the EM sensors 114, 164.

Figure 2:
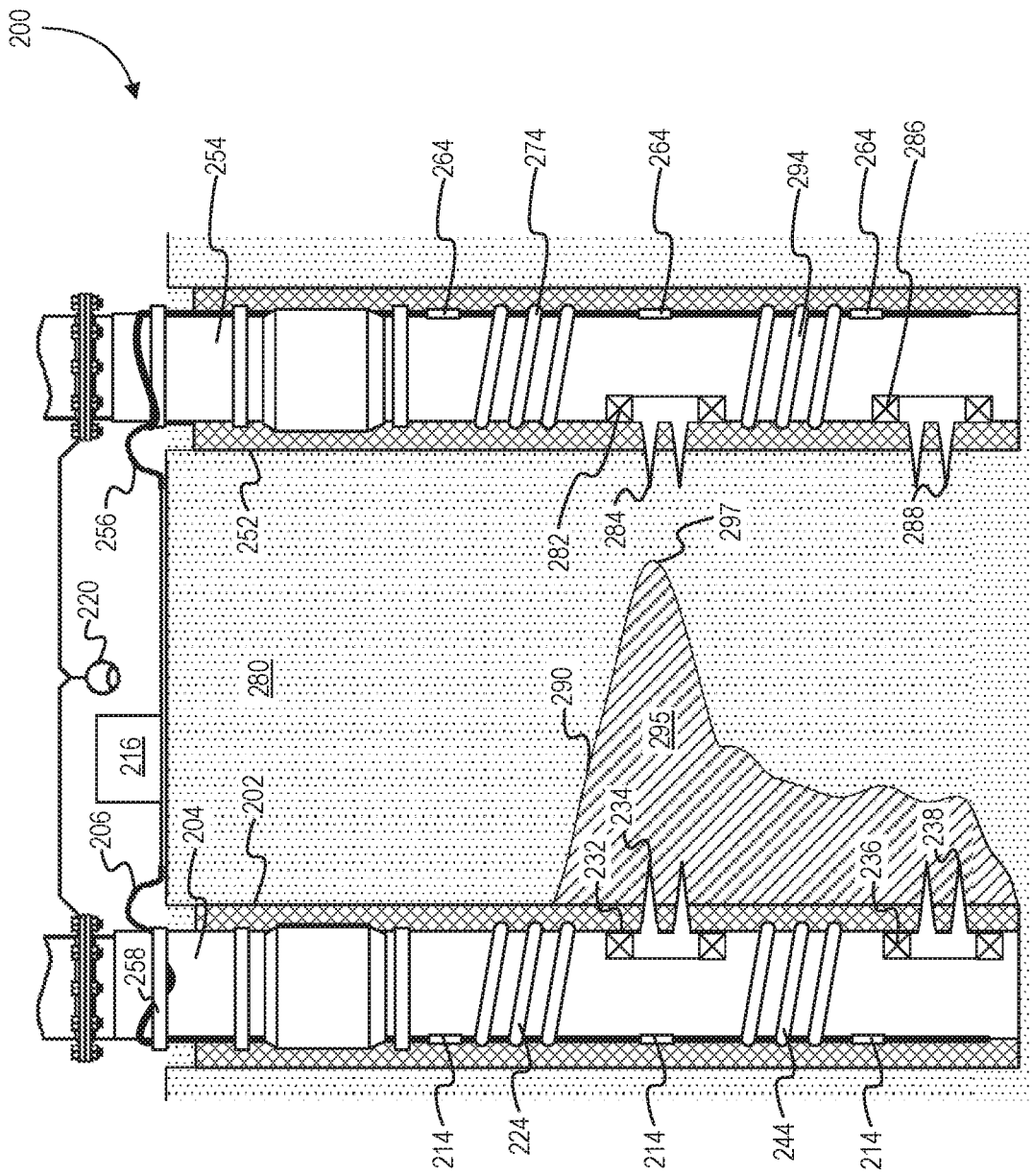
FIG. 2 depicts an example multi-well fiber optic EM system with flow control devices, according to some embodiments.

FIG. 2 depicts an example multi-well fiber optic EM system with flow control devices, according to some embodiments. The multi-well system 200 includes an injector well 202 and a producer well 252 drilled into the formation 280. A surface power source 220 provides power to an injector upper transmitter 224 and an injector lower transmitter 244 of the injector well 202, and to an injector upper transmitter 274 and an injector lower transmitter 294 of the producer well 252. A cable 206 is secured to the casing 204 and a fiber optic cable 256 is secured to the casing 254. EM sensors 214 can be integrated into the cable 206 and EM sensors 264 can be integrated into the fiber optic cable 256 to obtain EM signal measurements and communicate those measurements to a surface interrogator 216. The optical fibers in cable 206 and fiber optic cable 256 are coupled to one or more light sources and detectors in the surface interrogator 216. The surface interrogator 216 can be coupled to a computer that acts as a measurements acquisition and processing system to determine formation properties and track fluid activity in the formation.

The casing 204 has an injector upper perforation 234 and injector lower perforation 238. Likewise, the casing 254 has a producer upper perforation 284 and producer lower perforation 288. Fluid can enter and exit the injector well through the injector upper perforation 234 at injector upper valve 232 or through the injector lower perforation 238 at injector lower valve 236. Likewise, fluid can enter and exit the injector well through the producer upper perforations 284 at the producer upper valve 282 or through the producer lower perforation 288 at the producer lower valve 286. Each of the valves can be individually controlled, and can be part of an intelligent completions system. Similarly, many injection wells are provided with multiple injection zones that can be individually controlled.

Each valve includes equipment configured to control fluid communication between a formation and a well. For example, the injector upper valve 232 can control fluid communication between the formation and fluids in the casing 204. During an injection operation, the injector upper valve 232 and injector lower valve 236 can be open as injection fluid is pumped into the casing 204. The injector upper valve 232 and injector lower valve 236 allows injection fluid 295 to flow into the formation 280 and can create a flood front 290. The injection fluid 295 can flow through the formation and displace hydrocarbons and other fluids into the producer well 252 through the producer upper valve 282 and producer lower valve 286.

Injection fluids can include any suitable fluid used to cause a flow of formation fluid from the formation to a production well. Further, injection fluids can include a fluid used to reduce or eliminate an impediment to fluid production, such as an acid. As used herein, the term "fluid" or "fluids" includes liquids, gases, hydrocarbons, multi-phase fluids, mixtures of two of more fluids, water and fluids injected from the surface, such as water and/or acid. Additionally, references to water should be construed to also include water-based fluids; e.g., brine, sea water or salt water.

The EM sensors 214 and 264 can measure the EM signal from at least one of the transmitters to determine fluid saturations in a three-dimensional (3D) volume at multiple times. The fluid saturations can be used to determine the shape, position, and orientation of the injection fluid 295 volume and the flood front 290. The shape of the flood front 290 can be used to provide an assessment of the risk that that water breakthrough will occur. In some embodiments, the measurements made by the EM sensors 214 and 264 can be used to detect that the flood peak 297 is in proximity with the producer upper perforation 284. In response to an elevated risk for an unexpected or undesirable event such as water breakthrough, the injection operation can be modified by manipulating flow control systems (e.g., valves), changing a fluid flow rate, injecting a plugging fluid, etc. For example, in response to a determination that the water break through has occurred or is at risk of occurring based on a flood front model generated using the fiber optic EM measurements, the injector upper valve 232 and producer upper valve 282 can be closed to displace more formation fluid in the proximity of the injector lower valve 236 towards the producer lower valve 286.

Example Operations

Figure 3:
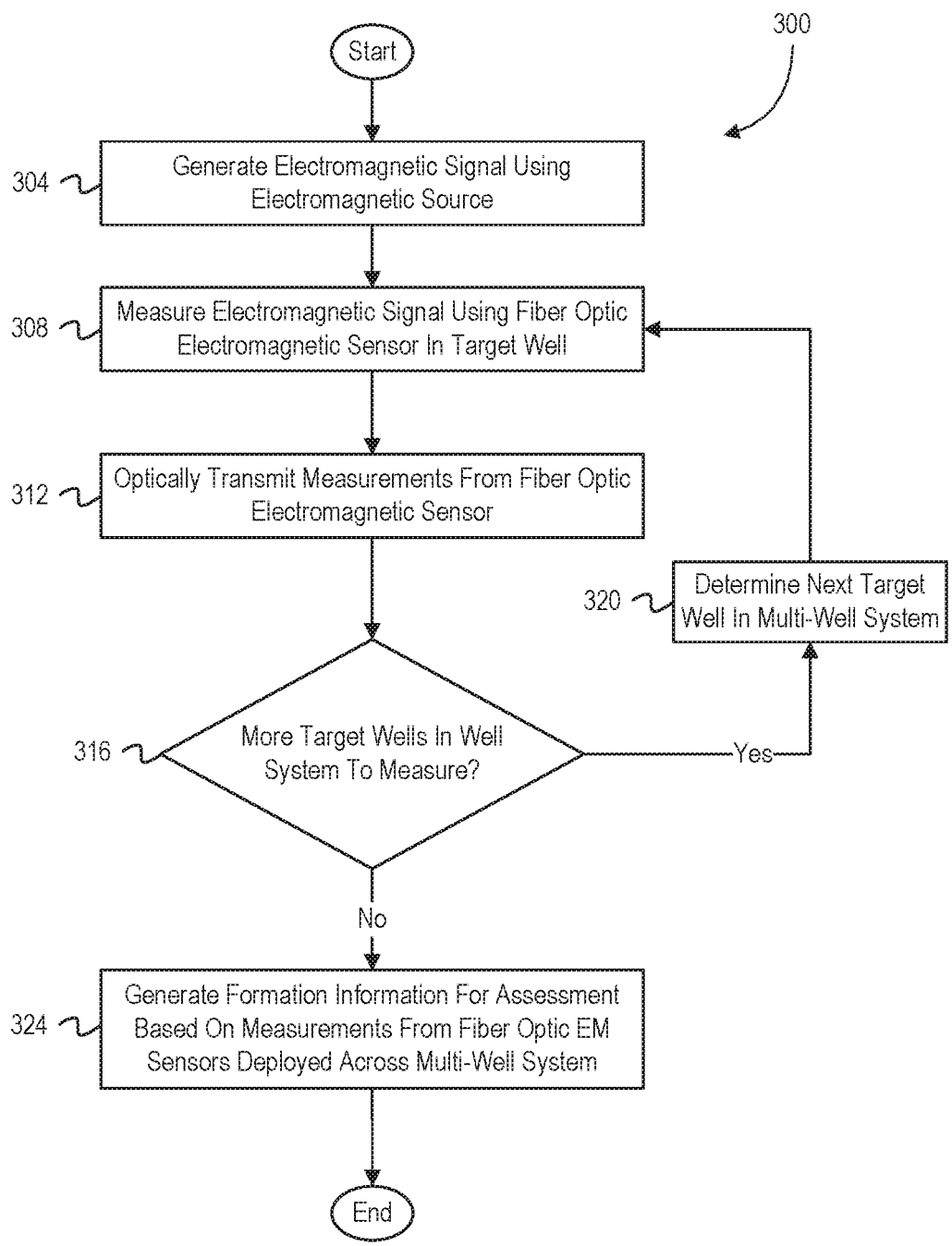
FIG. 3 depicts a flowchart of operations to acquire fiber optic EM measurements across a multi-well system, according to some embodiments.

FIG. 3 depicts a flowchart of operations to acquire fiber optic EM measurements across a multi-well system, according to some embodiments. Operations of the flowchart 300 begins at block 304. Initiation of EM signal measurement by fiber optic EM sensors distributed throughout wells of a multi-well system can be based on detection of a condition (s) or event(s) related to a state of the reservoir (e.g., reservoir saturation, oil in place, etc.). For example, EM signal measurement can be initiated based on other sensors communicating detection of a seismic event. In addition, the initiation can be based on a schedule that corresponds to scheduled production operations. For instance, EM signal measurement can be initiated based on a scheduling event that indicates a stimulating operation (e.g., initiating coincident with the stimulating operation).

At block 304, an EM signal is generated using an EM source. The EM signal can be a deep EM signal, which has an operating frequency less than or equal to 100 Hertz (Hz). The EM signal can also be a shallow EM signal, which can have frequencies greater than 100 Hertz. The EM signal can be a periodic EM signal such as a sinusoidal signal or a bipolar square waveform signal. For example, the EM signal can be sinusoidal and have a frequency equal to or below 10 Hz. Alternatively, the EM signal can be a regular periodic bipolar waveform with a duty cycle between 1% and 100% and a base frequency between 0.01 Hz and 1000 Hz. In some embodiments, a deep operating frequency in the range of 0.1 Hz to 10 Hz can provide a deeper signal penetration into the formation than operating frequencies greater than 10 Hz, and can provide a measurement range of at least 1000 feet.

In some embodiments, the EM sources can be controlled to independently operate EM sources, or to operate two or more EM sources as a set. The EM sources can be operated to simultaneously produce multiple modes of excitation while the multi-well fiber optic EM system is making measurements. For example, with reference to FIG. 1, a multiplexer attached to surface power source 120 can simultaneously activate the first upper transmitter 124 and the second upper transmitter 174 at a first frequency, activate the first lower transmitter 144 at a second frequency, and keep the second lower transmitter 194 deactivated.

At block 308, the EM signal is measured using the fiber optic EM sensor in a target well. A well can be labeled as a target well based on the EM sensing range of the well and/or the subsurface region to be monitored. For example, a system-wide monitoring activity can label every well having a fiber optic EM sensor as a target well. Alternatively, in the case where a specific subsurface region is to be monitored, the wells within a sensing range of the subsurface region can be monitored. The fiber optic EM sensor measures at least one of an electric signal, magnetic signal, or electromagnetic signal traveling through the formation around the target well. For example, with reference to FIG. 1, the magnetic signal generated by the first upper transmitter 124 can be measured by at least one of the EM sensors 114 and 164 after the magnetic signal travels through the formation 180.

At block 312, the measurements from the fiber optic EM sensor are optically transmitted. The measurements from the fiber optic EM sensor are transmitted via a fiber optic cable. For example, with respect to FIG. 1, the measurements acquired by the EM sensors 114 travel through the optical fibers in the fiber optic cable 106 to the surface interrogator 116. In some embodiments, the measurements can be transmitted through a single mode fiber in the well. Alternatively, the measurements can be transmitted through a multi-mode fiber in the well.

At block 316, a determination is made if there are more target wells in the well system to measure. A determination can be made that there are no more target wells in the well system to measure when each of the target wells in the well system have been measured. In some embodiments, a target well can be unable to communicate with an interrogator and the non-communicating target well can be considered as measured until communication can be re-established. If all the target wells in the well system have not been measured, the operation can proceed to block 320. If all the target wells in the well system have been measured, the operation can proceed to block 324.

At block 320, the next target well in the multi-well system is determined. The next target well in the multi-well system can be determined based on a predetermined index value associated with the well. For example, with respect to FIG. 1, the well 102 can be a target well with an index value of 1, the well 152 can be the next target well with an index value of 2. Alternatively, the next target well in the multi-well system can be determined based on a proximity to a subsurface feature or phenomenon. For example, with respect to FIG. 2, the EM sensors 214 can be chosen over the EM sensors 264 due to the greater proximity between the EM sensors 214 and the injection fluid 295.

At block 324, a data processing system generates formation information for assessment based on the measurements transmitted from the fiber optic EM sensors deployed across the multi-well system. The measurements may be transmitted via one or more intermediary devices before reaching the data processing system. For example, with reference to FIG. 1, a resistivity measurement from the EM sensors 114 is converted into a computer-readable form by the surface interrogator 116 and transmitted to a computer device by the surface interrogator 116. The formation information can include formation properties, formation features (faults, structural anomalies, etc.), fluid features (e.g., flood fronts, hydrocarbon rich regions, etc.), and/or information about the formation as a whole (e.g., total oil in place, total fluid saturation, etc.). The formation information allows for an assessment to be made that influences operations. The data processing system may generate a three-dimensional image of the formation based on the measurements, generate an alarm indicating an above-threshold risk of a water breakthrough, generate a message suggesting that a well should be a candidate for abandoning or stimulation activity, etc.

In some embodiments, parameters or measurements taken from the EM sources can also be transmitted to a computer device. The parameters or measurements from the EM sources can associated with the measurements from the fiber optic EM sensors. For example, with reference to FIG. 1, the current and voltage of the first upper transmitter 124 during a reservoir monitoring operation can be associated to the measurements from the EM sensors 114 and 164, and telemetered by electrical or optical methods to the computer device for further processing.

Figure 4:
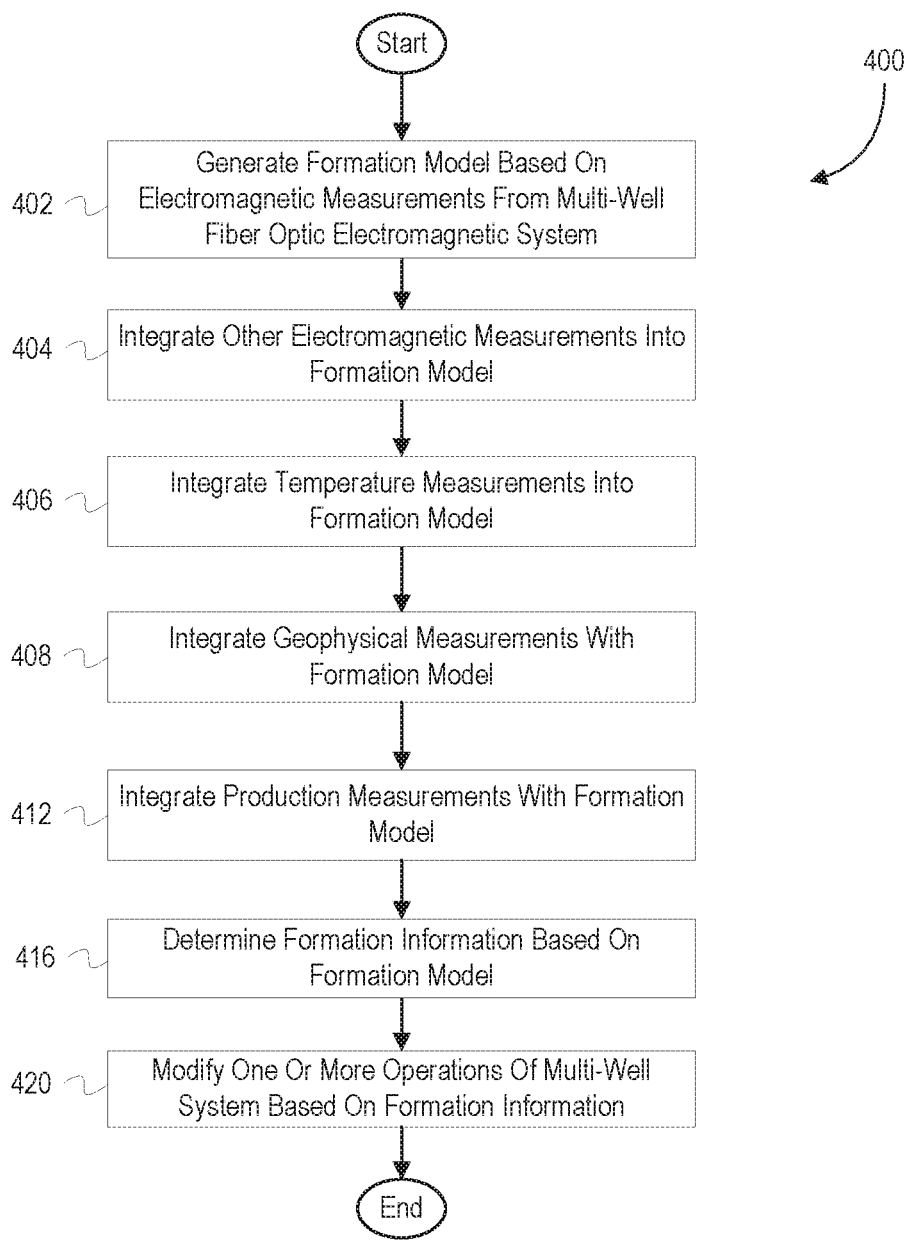
FIG. 4 depicts a flowchart of operations to modify operations at a multi-well system based on measurements from a multi-well fiber optic EM system, according to some embodiments.

FIG. 4 depicts a flowchart of operations to modify operations at a multi-well system based on measurements from a multi-well fiber optic EM system, according to some embodiments. Operations of flowchart 400 begin at block 402.

At block 402, a formation model is generated based on the EM measurements from the multi-well fiber optic EM system. A formation model can be any model that associates formation properties (e.g., resistivity, conductivity, fluid saturation, density, etc.) with a spatial coordinate or specified volume in the formation. The measurements from the EM sensors of the multi-well fiber optic EM system can be processed (e.g., modeling, inverting, imaging, etc.) to determine formation properties at one or more regions in the formation. For example, with reference to FIG. 2, measurements from the EM sensors 214 and 264 can be used to determine the resistivity and fluid saturation of the volume containing the injection fluid 295 to generate a 3D formation model. In some embodiments, time-lapse EM measurements can be used to generate a time-lapse formation model.

In some embodiments, EM signal measurements from different wells can be enhanced through compensation. Compensating EM signal measurements from a multi-well fiber optic EM system can improve measurement accuracy due in part to the EM sensors being in different wells instead of a single well, which provides more multi-dimensional information. The EM signal measurements can be compensated using data stacking, averaging, and other processing techniques. For example, with reference to FIG. 2, low frequency (e.g., <100 Hz) measurements collected by the EM sensors 214 and 264 can be combined using a data stacking method to increase the accuracy of resistivity measurements corresponding with the injection fluid 295.

At block 404, other EM measurements are integrated into the formation model. Other resistivity measurements can include well-based resistivity measurements made using non-fiber optic EM sensors taken from both open-hole wells and cased-hole wells. Examples of other well-based resistivity measurements can be from any one or combination of logging-while-drilling (LWD) resistivity measurements, single-component wireline resistivity measurements, multi-component wireline resistivity measurements, wireline dielectric measurements, etc. These other resistivity measurements can be integrated into the formation model using various interpolation/extrapolation algorithms based on geostatistical methods.

At block 406, temperature measurements are integrated into the formation model. Temperature measurements can be acquired from various subsurface temperature-measuring systems, such as a set of electrical thermometers and/or a DTS system. In some embodiments, the temperature measurements can be processed, imaged, and/or inverted to refine and constrain the formation model by considering the temperature changes in response to various temperature-dependent factors (e.g., temperature distribution, thermal conductivity, etc.) used for analysis of the acquired EM measurements. For example, a formation model can be updated by compensating for temperature-dependent resistivity changes. Alternatively, the temperature measurements can be used with any other available measurements to jointly or simultaneously generate an updated formation model.

At block 408, geophysical measurements are integrated into the formation model. Geophysical measurements can include various forms of measurements related to the physical properties of the formation, such as seismic measurements, gravity measurements, etc. The geophysical measurements can be acquired from a DAS system and/or multicomponent seismic sensors. The geophysical measurements can be processed, imaged (including depth migration), and/or inverted to construct or constrain the formation model. For example, with reference to FIG. 2, geophysical measurements collected from the formation 280 can be integrated with a formation model based on EM measurements from EM sensors 214 and 264 to determine the reservoir volume of the formation 280. Determining a reservoir volume can increase modeling efficiency by constraining the formation model to focus on formation properties in the reservoir volume. For example, the formation model can be constrained to determine oil-water contact boundaries within the seismic-derived reservoir volume. Alternatively, the seismic measurements can be processed, and then jointly or simultaneously imaged and/or inverted with the EM measurements to generate/update a formation model such as a 3D formation model.

At block 412, the production measurements are integrated with the formation model. Production measurements are acquired from sensors or parameters directly tied to a well operation, and can include measurements related to volumetrics, chemical tracing, or radioactive tracing. The EM measurements can be integrated with production measurements using methods of cooperative or joint modeling, inversion, or imaging. For example, with reference to FIG. 2, time-lapse EM measurements from the EM sensors 214 and 264 can be integrated with a fluid injection rate measured to constrain the model size for the volume of the injection fluid 295.

At block 416, formation information is determined based on the formation model. In some embodiments, the formation model can directly include target formation information such as a formation property, feature, and/or category from previous processing operations. For example, a 3D formation model with 3D sensitivities can include resistivity measurements for a 3D volume from block 402. Alternatively, values in the formation model can be used to determine new formation information based on the acquired measurements. In some embodiments, long-range EM signals such as low-frequency EM signals can be processed to produce 3D sensitivities. In some embodiments, temperature, seismic measurements, and EM measurements can be jointly inverted to generate a 3D formation model. The EM measurements can be continuously or periodically processed to update the formation model and provide measurements for a time-lapse analysis.

For example, with reference to FIG. 2, EM measurements from the EM sensors 214 and 264 provide a multi-dimensional resistivity profile of the formation 280 at multiple times. The multi-dimensional resistivity profile can be used to determine the fluid saturations of the formation 280 in a 3D volume at multiple times. The determined fluid saturations can be used to track the dimensions of the flood front 290 during a well flooding process using the injection fluid 295. Based on a volume or coordinate having a water saturation value greater than a saturation threshold, the region corresponding with the flood peak 297 is considered part of the flood front. The proximity between the flood peak 297 and the producer upper valve 282 can be used to determine a categorical risk (e.g., "at risk" or "not at risk") or quantified risk for the likelihood of a water breakthrough event during the well flooding process. In addition, one or more valve control indications can be generated to label which of the valves should be open or closed in response to the risk of water breakthrough. In some embodiments, the 3D formation map and water flood can also be accessible through an application programmable interface (API) and incorporated into downstream modeling software.

At block 420, one or more operations of the multi-well system is modified based on the formation information. A multi-well system operation can be modified by activating or deactivating controllable devices in the downhole environment, modifying a drilling direction, determining which fractures to perforate, changing a producer/injector well flow rate, etc. The modification can be based on formation information such as whether a formation property is beyond a threshold, a specific category has been assigned, a relationship between a formation feature and a well is beyond a threshold, etc. For example, with reference to FIG. 2, the injector upper valve 232 at producer well 252 can be closed during an injection operation in response to an assessment that a water breakthrough risk is too great based on a volume within a distance threshold from the injector upper valve 232 having a water saturation that exceeds a saturation threshold.

Figure 5:
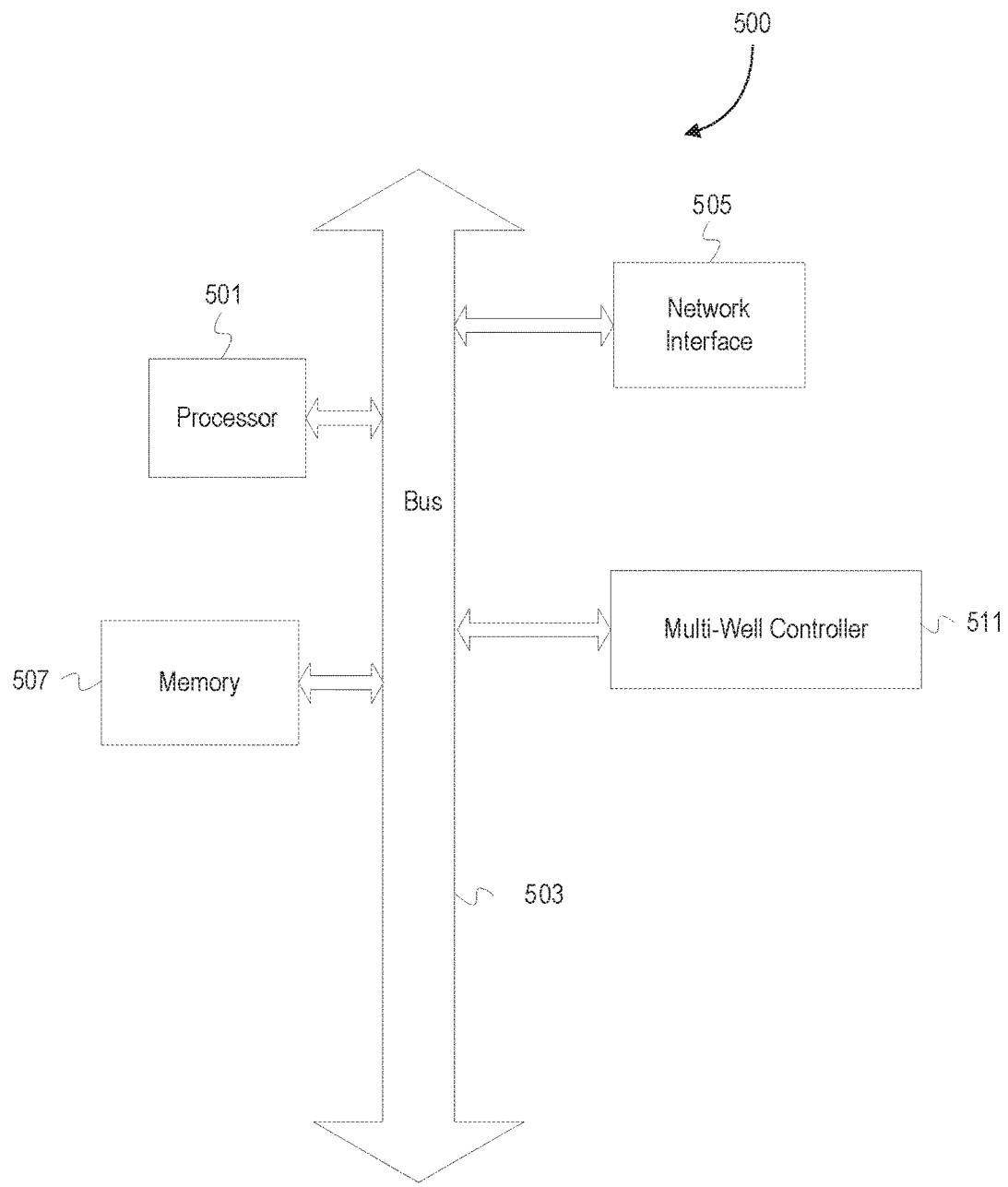
FIG. 5 depicts an example computer device, according to some embodiments.

FIG. 5 depicts an example computer device, according to some embodiments. A computer device 500 includes a processor 501 (possibly including multiple processors, multiple cores, multiple nodes, and/or implementing multi-threading, etc.). The computer device 500 includes a memory 507. The memory 507 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 500 also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.).

The computer device 500 includes a multi-well controller 511. The multi-well controller 511 can perform one or more operations described above. For example, the multi-well controller 511 can generate a formation model based on EM signals from a plurality of wells. Additionally, the multi-well controller 511 can determine the risk of water breakthrough based on the formation model.

Any one of the previously described functionalities can be partially (or entirely) implemented in hardware and/or on the processor 501. For example, the functionality can be implemented with an application specific integrated circuit, in logic implemented in the processor 501, in a co-processor on a peripheral device or card, etc. Further, realizations can include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 can be coupled to the processor 501. The computer device 500 can be device at the surface and/or integrated into component(s) in the well, and can be in electric communication with an optical interrogator.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system."

A machine-readable medium can be, for example, but not limited to, a system, apparatus, or device, that employs any one of or combination of electronic, magnetic, optical, electromagnetic, infrared, or semiconductor technology to store program code. In the context of this document, a machine-readable medium can be any tangible medium that can contain, or store a program for use by or in connection with an instruction execution system, apparatus, or device.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: activating a first electromagnetic source of a multi-well system in a formation; based on activating the first electromagnetic source, acquiring a first set of electromagnetic measurements from a first fiber optic electromagnetic sensor in a first well of the multi-well system and a second set of electromagnetic measurements from a second fiber optic electromagnetic sensor in a second well of the multi-well system, wherein the first fiber optic electromagnetic sensor and the second fiber optic electromagnetic sensor are respectively deployed in the first and the second wells independent of a well tool; determining a formation property of the formation based on the first set of electromagnetic measurements and the second set of electromagnetic measurements; and generating formation information based, at least in part, on the formation property for an assessment of a reservoir management operation.

Embodiment 2: The method of Embodiment 1, further comprising: determining that the formation property exceeds a threshold, wherein generating the formation information comprises at least one of indicating of a well operation to perform and modifying the reservoir management operation based on determining that the formation property exceeds the threshold.

Embodiment 3: The method of Embodiments 1 or 2, further comprising: activating a second electromagnetic source at a different frequency than the first electromagnetic source.

Embodiment 4: The method of any of Embodiments 1-3, wherein generating the formation information comprises generating a three-dimensional formation model based on the first set of electromagnetic measurements and the second set of electromagnetic measurements.

Embodiment 5: The method of any of Embodiments 1-4: wherein activating the first electromagnetic source is based on indication of an injection activity corresponding to the first and the second wells; and wherein acquiring the first set of electromagnetic measurements and the second set of electromagnetic measurements is during the injection activity, wherein generating the formation information for assessment of the reservoir management operation comprises generating a set of one or more valve control indications related to the injection activity.

Embodiment 6: The method of any of Embodiments 1-5, wherein determining the formation property comprises determining the formation property also based on one or more temperature measurements from the first well.

Embodiment 7: The method of any of Embodiments 1-6, wherein the first electromagnetic source has an operating frequency less than or equal to 100 Hz.

Embodiment 8: The method of any of Embodiments 1-7, wherein activating the first electromagnetic source is based on at least one of detection of an event that impacts reservoir saturation, a schedule of well operations, and a periodic measuring schedule, wherein generating the formation information comprises generating an indication to abandon a well or to rework the well.

Embodiment 9: A multi-well system comprising: a first electromagnetic source; a first fiber optic electromagnetic sensor installed into a first well of a subsurface formation; a second fiber optic electromagnetic sensor installed into a second well of the subsurface formation; a processor; and a machine-readable medium having program code executable by the processor to cause the processor to, activate the first electromagnetic source, based on activating the first electromagnetic source, acquire a first set of electromagnetic measurements from the first fiber optic electromagnetic sensor and a second set of electromagnetic measurements from the second fiber optic electromagnetic sensor, and determine a formation property of the subsurface formation based on the first set of electromagnetic measurements and the second set of electromagnetic measurements.

Embodiment 10: The multi-well system of Embodiment 9, wherein the program code further comprises program code to cause the processor to: generate formation information based, at least in part, on the formation property for an assessment of reservoir management operation; and determine that the formation property exceeds a threshold, wherein generating the formation information comprises at least one indicating of a well operation to perform and modifying the reservoir management operation based on determining that the formation property exceeds the threshold.

Embodiment 11: The multi-well system of Embodiments 9 or 10, further comprising a first valve in fluid communication with the first well and in fluid communication with the subsurface formation, wherein the machine-readable medium further has program code executable by the processor to cause the multi-well system to control the first valve based, at least in part, on the formation property.

Embodiment 12: The multi-well system of any of Embodiments 9-11, further comprising a second valve in fluid communication with the second well and in fluid communication with the subsurface formation, wherein the machine-readable medium further has program code executable by the processor to cause the multi-well system to control the second valve in coordination with the first valve.

Embodiment 13: The multi-well system of any of Embodiments 9-12, further comprising: an interrogator in optical communication with the first fiber optic electromagnetic sensor, wherein the interrogator is configured to acquire at least one of acoustic measurements and temperature measurements.

Embodiment 14: The multi-well system of any of Embodiments 9-13, further comprising a second electromagnetic source, wherein the both the first electromagnetic source and the second electromagnetic source are attached to the first well.

Embodiment 15: The multi-well system of any of Embodiments 9-14, wherein a distance between the first electromagnetic source and the second electromagnetic source is based on a distance between permeable layers in the subsurface formation.

Embodiment 16: The multi-well system of any of Embodiments 9-15, wherein the first fiber optic electromagnetic sensor is installed in the first well instead of being attached to a well tool and the second fiber optic electromagnetic sensor is installed in the second well instead of being attached to a well tool.

Embodiment 17: The multi-well system of any of Embodiments 9-16, further comprising a first set of one or more fiber optic cables deployed into the first well independent of a well tool and a second set of one or more fiber optic cables deployed into the second well independent of a well tool, wherein the first fiber optic electromagnetic sensor is integrated into the first set of one or more fiber optic cables and the second fiber optic electromagnetic sensor is integrated into the second set of one or more fiber optic cables.

Embodiment 18: A multi-well system comprising: a first set of one or more fiber optic cables installed in a first of a plurality of wells in a subsurface formation, wherein a first set of one or more fiber optic electromagnetic sensors is integrated into the first set of one or more fiber optic cables; a second set of one or more fiber optic cables installed in a second of the plurality of wells in the subsurface formation, wherein a second set of one or more fiber optic electromagnetic sensors is integrated into the second set of one or more fiber optic cables; and a device having a machine-readable medium comprising program code executable by a processor of the device to cause the processor to, activate a first electromagnetic source; based on activating the first electromagnetic source, acquire a first set of electromagnetic measurements from the first set of one or more fiber optic electromagnetic sensors and a second set of electromagnetic measurements from the second set of one or more fiber optic cables; determine a formation property of the subsurface formation based on the first set of electromagnetic measurements and the second set of electromagnetic measurements; and generate formation information based, at least in part, on the formation property for an assessment of reservoir management operation.

Embodiment 19: The multi-well system of Embodiment 18, further comprising a casing in the first of the plurality of wells in the subsurface formation, wherein the first set of one or more fiber optic cables is attached to an exterior of the casing.

Embodiment 20: The multi-well system of Embodiments 18 or 19, further comprising a cable protector to protect the first set of one or more fiber optic cables from damage, wherein the cable protector is attached to the casing.

What is claimed is:

1. A method comprising:
    activating a first electromagnetic source of a multi-well system in a formation, wherein the first electromagnetic source and a second electromagnetic source are attached to a first well, and wherein a distance between the first electromagnetic source and the second electromagnetic source is based on a distance between permeable layers in the formation;
    based on activating the first electromagnetic source, acquiring a first set of electromagnetic measurements from a first fiber optic electromagnetic sensor in the first well of the multi-well system and a second set of electromagnetic measurements from a second fiber optic electromagnetic sensor in a second well of the multi-well system, wherein the first fiber optic electromagnetic sensor and the second fiber optic electromagnetic sensor are respectively deployed in the first and the second wells independent of a well tool;
    determining a formation property of the formation based on the first set of electromagnetic measurements and the second set of electromagnetic measurements; and
    generating formation information based, at least in part, on the formation property for an assessment of a reservoir management operation.

2. The method of claim 1, further comprising determining that the formation property exceeds a threshold, wherein generating the formation information comprises at least one of indicating a well operation to perform and modifying the reservoir management operation based on determining that the formation property exceeds the threshold.

3. The method of claim 1, further comprising activating the second electromagnetic source at a different frequency than the first electromagnetic source.

4. The method of claim 1, wherein generating the formation information comprises generating a three-dimensional formation model based on the first set of electromagnetic measurements and the second set of electromagnetic measurements.

5. The method of claim 1:
    wherein activating the first electromagnetic source is based on indication of an injection activity corresponding to the first and the second wells; and
    wherein acquiring the first set of electromagnetic measurements and the second set of electromagnetic measurements is during the injection activity,
    wherein generating the formation information for assessment of the reservoir management operation comprises generating a set of one or more valve control indications related to the injection activity.

6. The method of claim 1, wherein determining the formation property comprises determining the formation property also based on one or more temperature measurements from the first well.

7. The method of claim 1, wherein the first electromagnetic source has an operating frequency less than or equal to 100 Hz.

8. The method of claim 1, wherein activating the first electromagnetic source is based on at least one of detection of an event that impacts reservoir saturation, a schedule of well operations, and a periodic measuring schedule, wherein generating the formation information comprises generating an indication to abandon a well or to rework the well.

9. A system comprising:
a first electromagnetic source and a second electromagnetic source, wherein the first electromagnetic source and the second electromagnetic source are attached to a first well and wherein a distance between the first electromagnetic source and the second electromagnetic source is based on a distance between permeable layers in a subsurface formation;
a first fiber optic electromagnetic sensor installed into the first well of the subsurface formation;
a second fiber optic electromagnetic sensor installed into a second well of the subsurface formation;
a processor; and
a machine-readable medium having program code executable by the processor to cause the processor to,
activate the first electromagnetic source,
based on activating the first electromagnetic source, acquire a first set of electromagnetic measurements from the first fiber optic electromagnetic sensor and a second set of electromagnetic measurements from the second fiber optic electromagnetic sensor, and
determine a formation property of the subsurface formation based on the first set of electromagnetic measurements and the second set of electromagnetic measurements.

10. The system of claim 9, wherein the program code further comprises program code to cause the processor to:
generate formation information based, at least in part, on the formation property for an assessment of reservoir management operation; and
determine that the formation property exceeds a threshold, wherein generating the formation information comprises at least one indicating of a well operation to perform and modifying the reservoir management operation based on determining that the formation property exceeds the threshold.

11. The system of claim 9, further comprising a first valve in fluid communication with the first well and in fluid communication with the subsurface formation, wherein the machine-readable medium further has program code executable by the processor to cause the multi-well system to control the first valve based, at least in part, on the formation property.

12. The system of claim 11, further comprising a second valve in fluid communication with the second well and in fluid communication with the subsurface formation, wherein the machine-readable medium further has program code executable by the processor to cause the multi-well system to control the second valve in coordination with the first valve.

13. The system of claim 9, further comprising:
an interrogator in optical communication with the first fiber optic electromagnetic sensor, wherein the interrogator is configured to acquire at least one of acoustic measurements and temperature measurements.

14. The system of claim 9, further comprising a well tool, wherein the first fiber optic electromagnetic sensor is installed in the first well instead of being attached to the well tool and the second fiber optic electromagnetic sensor is installed in the second well instead of being attached to the well tool.

15. The system of claim 9, further comprising a first set of one or more fiber optic cables deployed into the first well independent of a well tool and a second set of one or more fiber optic cables deployed into the second well independent of a well tool, wherein the first fiber optic electromagnetic sensor is integrated into the first set of one or more fiber optic cables and the second fiber optic electromagnetic sensor is integrated into the second set of one or more fiber optic cables.

16. A system comprising:
a first set of one or more fiber optic cables installed in a first of a plurality of wells in a subsurface formation, wherein a first set of one or more fiber optic electromagnetic sensors is integrated into the first set of one or more fiber optic cables;
a second set of one or more fiber optic cables installed in a second of the plurality of wells in the subsurface formation, wherein a second set of one or more fiber optic electromagnetic sensors is integrated into the second set of one or more fiber optic cables; and
a device having a machine-readable medium comprising program code executable by a processor of the device to cause the processor to,
activate a first electromagnetic source and a second electromagnetic source, wherein the first electromagnetic source and the second electromagnetic source are attached to the first of a plurality of wells, and wherein a distance between the first electromagnetic source and the second electromagnetic source is based on a distance between permeable layers in the subsurface formation;
based on activating the first electromagnetic source, acquire a first set of electromagnetic measurements from the first set of one or more fiber optic electromagnetic sensors and a second set of electromagnetic measurements from the second set of one or more fiber optic cables;
determine a formation property of the subsurface formation based on the first set of electromagnetic measurements and the second set of electromagnetic measurements; and
generate formation information based, at least in part, on the formation property for an assessment of reservoir management operation.

17. The system of claim 16, further comprising a casing in the first of the plurality of wells in the subsurface formation, wherein the first set of one or more fiber optic cables is attached to an exterior of the casing.

18. The system of claim 17, further comprising a cable protector to protect the first set of one or more fiber optic cables from damage, wherein the cable protector is attached to the casing.

* * * * *